United States Patent [19]

Tanaka et al.

[11] Patent Number: 5,377,352

[45] Date of Patent: Dec. 27, 1994

[54] METHOD OF SCHEDULING TASKS WITH PRIORITY TO INTERRUPTED TASK LOCKING SHARED RESOURCE

[75] Inventors: Kazuaki Tanaka, Sagamihara; Sadasaburo Kanai, Yokohama; Shoji Yamamoto, Chigasaki; Takashi Sumiyoshi, Yokohama; Tetsuhiko Fujii, Kawasaki, all of Japan

[73] Assignee: Hitachi, Ltd., Tokyo, Japan

[21] Appl. No.: 3,858

[22] Filed: Jan. 8, 1993

Related U.S. Application Data

[63] Continuation of Ser. No. 357,169, May 26, 1989, abandoned.

[30] Foreign Application Priority Data

May 27, 1988 [JP] Japan .................... 63-128391

[51] Int. Cl.⁵ .................... G06F 9/46; G06F 12/00
[52] U.S. Cl. .................... 395/650; 364/DIG. 1; 364/241.2; 364/246.8; 364/280.8; 364/281.3; 364/281.6; 364/281.7; 364/281.8
[58] Field of Search ........... 395/650, DIG. 1, DIG. 2

[56] References Cited

U.S. PATENT DOCUMENTS

| | | | |
|---|---|---|---|
| 3,528,062 | 9/1970 | Lehman et al. | 364/200 |
| 4,435,780 | 3/1984 | Herrington et al. | 364/900 |
| 4,584,644 | 4/1986 | Larner | 364/200 |
| 4,642,756 | 2/1987 | Sherrod | 364/200 |
| 4,750,116 | 6/1988 | Pham et al. | 364/200 |
| 4,912,628 | 3/1990 | Briggs | 364/200 |
| 4,965,719 | 10/1990 | Shoens et al. | 364/200 |
| 5,012,409 | 4/1991 | Fletcher et al. | 364/200 |

OTHER PUBLICATIONS

Madnick, S. E. Donovan, J. J. Operating Systems McGraw-Hill New York, 1974 pp. 209-267.

Primary Examiner—Gareth D. Shaw
Assistant Examiner—Kakali Chaki
Attorney, Agent, or Firm—Antonelli, Terry, Stout & Kraus

[57] ABSTRACT

A computer system including a plurality of shared resources to be used exclusively by a plurality of tasks. Upon occurrence of an interrupt, execution of the task running at that time is suspended to allow the interrupt task to be executed. After execution of the interrupt task, one of the tasks remaining in the execution waiting state is selected for execution. A method of scheduling tasks with priority to the task locking a shared resource includes the steps of registering a task identifier of a task being executed upon locking of the task to a resource, invalidating the registered identifier of the task when that task releases the shared resource from the locked state, deciding whether or not a valid task identifier representing the task which was running by locking the shared resource is registered when a task to be executed next is to be selected after execution of the interrupt task, and selecting the task designated by the task identifier, if registered, to thereby select the task as the one to be executed with priority.

9 Claims, 12 Drawing Sheets

500
SETTING OF TASK IDENTIFIER IN LOCKING TASK TABLE IN RESPONSE TO MESSAGE AT STEP 304 IN FIG. 3

600
DELETION OF TASK IDENTIFIER FROM LOCKING TASK TABLE IN RESPONSE TO MESSAGE AT STEP 403 OR 405 IN FIG. 4

FIG. 7

700 SELECTION OF TASK TO BE EXECUTED AFTER INTERRUPT PROCESSING

METHOD OF SCHEDULING TASKS WITH PRIORITY TO INTERRUPTED TASK LOCKING SHARED RESOURCE

This application is a continuation of application Ser. No. 357,169, filed on May 26, 1989, now abandoned.

BACKGROUND OF THE INVENTION

The present invention relates to a task scheduling method for controlling the priorities with which individual tasks are to be executed in a computer system incorporating a shared resource or resources such as I/O devices or files to be used in common by a plurality of tasks.

In a conventional task scheduling method, the task performs a processing for occupying the requisite shared resource (this processing is referred to as "lock processing") and a processing for releasing the shared resource from the occupied state (referred to as "unlock processing"), as is disclosed, for example, in Madnick, S. E. and Donovan, J. J., "Operating System" published by McGraw Hill of New York in 1974, pp. 209-267. The task successfully occupying the shared resource or the task having no need to use the shared resource is referred to as the task in the execution-ready state or the execution-ready task or simply as the ready task. From a plurality of tasks, a task to be executed by an assigned CPU (central processing unit) or processor is appropriately selected by an operating system (dispatch program) provided separately for the purpose of task scheduling. Let's suppose that when a task (referred to as task 1 for convenience of discussion) is running in the state locking a given shared resource, and some sort of interrupt takes place. In that case, the task 1 is once changed to the execution-ready state from the running state, whereon an interrupt processing task (termed the task 2) provided separately is activated. Upon completion of the processing for the task 2, one of the plural tasks held in the execution-ready state is selected for execution by the above-mentioned dispatch program on the basis of priorities allocated previously to the individual tasks of the ready state, respectively. In this connection, problems will arise. More specifically, suppose that another task (termed the task 3) other than the above-mentioned task 1 starts to run after the interrupt processing and requires the use of the shared resource which is locked by the task 1. In this case, the task 3 can not use the shared resource locked by the task 1 and is placed in the queue waiting for the release of the shared resource until the locking task 1 has been executed and the shared resource is released from the locked state. Consequently, suppose a further ready-task 4 starts to run and encounters the same situation as the task 3 mentioned above. As a result, the processing steps involved in the unlock wait processing, the task discontinue (or suspend) processing as well as failure in acquiring the lock due to activation of other processing increases the total number of the steps to be executed.

To cope with the problem described above, there is known from JP-A-59-190950 a task priority control method in which when a conflict occurs among the tasks using the shared resource, as described above, the priority assigned to the task 1 locking the shared resource is made higher than the level which can be set by the user so that the task 1 can be executed with priority over the others. This in turn allows the use of the shared resource by the task 1 to be ended earlier.

Further, there is known a task priority scheduling method from JP-A-62-65137 according to which the higher one of the priorities assigned to the user task 1 locking the shared resource and the user task 2 awaiting the use of the shared resource, respectively is reassigned as priority to the user task 1 for allowing the latter to be executed with priority over the task 2.

According to the conventional systems disclosed in JP-A-59-170950 and JP-A-62-65137, the tasks are re-scheduled with respect to the priorities by using the shared resource and taking advantage of the occurrence of conflicts when using the shared resource. Consequently, there may take place such undesirable situations that (1) re-execution of processing for the task 1 once discontinued due to the interrupt such as I/O interrupt is replaced by execution of the task 2 having the same priority level as that of the task 1 and (2) the task 2 is placed exclusively in the resource request queue when a plurality of tasks (tasks 1 and 2) are concurrently executed by a multiprocessor system.

In case (1) mentioned above, a processing (i) for placing the task 2 in the resource request queue is first performed, being then followed by a processing (ii) for placing the task 2 in the execution waiting state while placing the task 1 in the execution-ready state according to the conventional system. After the exclusive use of the shared resource by the task 1, a processing (iii) for imparting the right of exclusive use of the shared resource to the task 2 is performed. Subsequently, the shared resource is used exclusively by the task 2 (iv). This means for the succeeding task 3 that the period during which the shared resource is exclusively occupied by the task 2 increases from the time or period required for the processing (iv) to a sum of the periods required for the processings (i), (ii), (iii) and (iv), respectively.

Similarly, in the case (2) mentioned above, a processing (i) for placing the task (2) in the resource request queue is performed by another processor in parallel with the exclusive use of the shared resource by the task (1). Even when the exclusive use of the shared resource by the task (1) is ended, a processing (iii) for giving the right of exclusive use of the resource to the task (2) to set the latter in the execution waiting state must wait (v) till the end of the processing (i). Subsequently, the shared resource is then used exclusively by the task (2) . This means for the succeeding task (3) that the period for which the shared resource is occupied by the task 2 increases from the period (iv) to a sum of (v), (iii) and (iv).

Under these circumstances, the probability of the succeeding task (3) using the shared resource during the executive use thereof by the task (2) is increased. In general, since the total period for the processings (i), (ii) and (iii) or (v) and (iii) is far longer than the period (iv), the probability of use of the shared resource by the succeeding tasks increases rapidly, wherein these tasks are placed in the queue state from one to another, which in turn means that the overhead of the processings (i) and (ii) is increased thus lowering the throughtput.

SUMMARY OF THE INVENTION

An object of the present invention is to provide a task scheduling method which is effective even for the processing in which priorities assigned to tasks in individual transactions are at the same level as in the case of the data base on-line. This will allow a task starting the use of a shared resource to be executed with priority and completed earlier than the use of the resource by that task to thereby avoid the difficulty of tasks with the same priority occurring in the exclusive queue.

For accomplishing the above object, the method according to the present invention provides scheduling tasks with priority to a task locking a shared resource comprising the steps of registering a task identifier of a task which is being executed upon locking of a shared resource by the task; invalidating the registered task identifier when that task unlocks the shared resource; deciding whether or not a valid task identifier representing a task which was running while locking the shared resource is registered when a task next to be executed is to be selected after execution of the interrupt processing task; and selecting a task designated by the valid task identifier, if registered, to thereby select the task as one to be executed with priority.

DESCRIPTION OF THE PREFERRED EMBODIMENTS

In the following, the present invention will be described in detail in conjunction with the preferred or exemplary embodiments thereof with reference to the accompanying drawings.

EMBODIMENT 1

Figure 1:
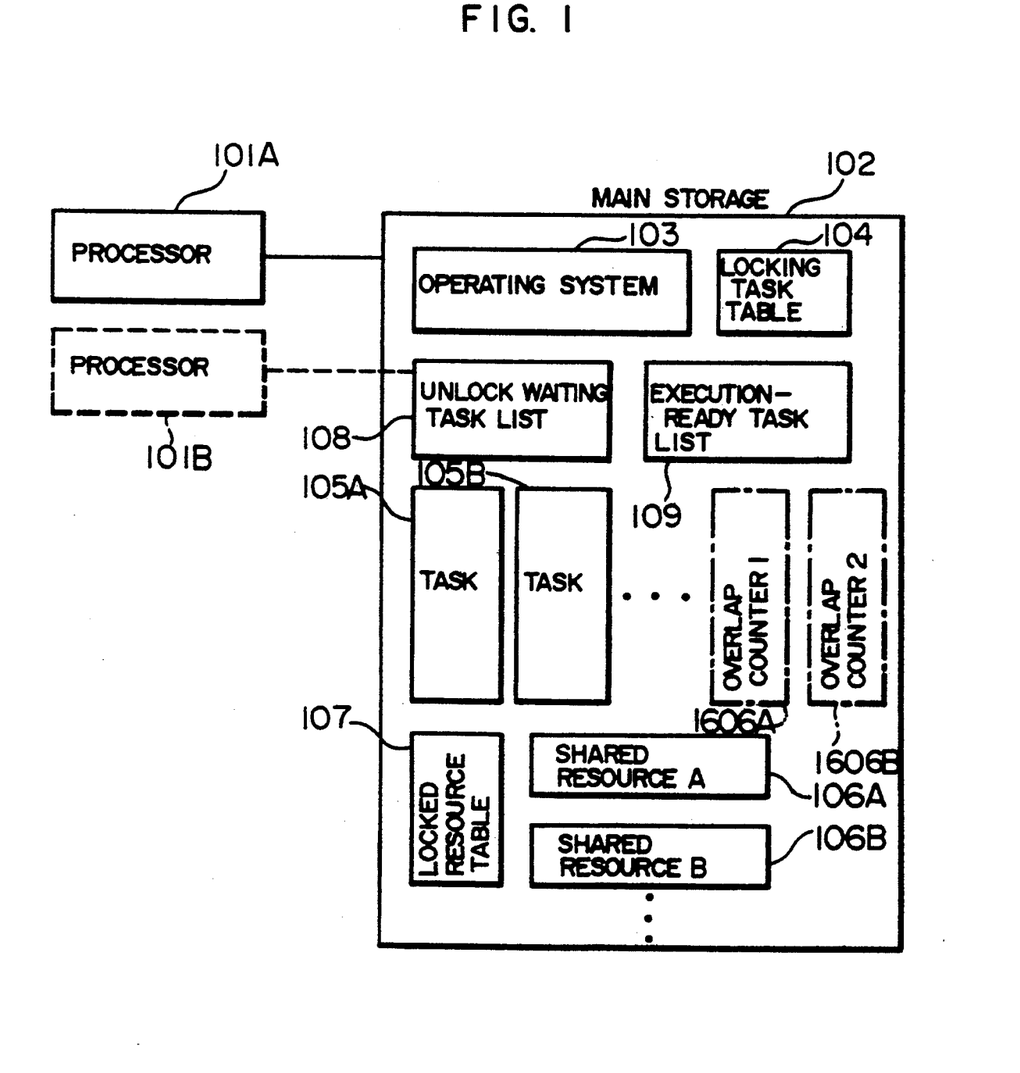
FIG. 1 is a block diagram showing a general arrangement of the computer system to which the present invention can be applied.

FIG. 1 is a schematic block diagram showing a general arrangement of the computer system according to an embodiment of the invention. In the Figure, reference numeral 101 denotes a processor, 102 denotes a main storage, 103 denotes an operating system, 104 denotes a locking task table for holding task identifiers of tasks which are locking a shared resource or resources, 105A and 105B denote a group of tasks for executing application programs, 106 denotes the shared resources stored in the main storage 102 and a numeral 107 denotes a locked resource table for holding for each of the shared resources the indication as to whether the associated shared resource is being locked or not. This table 107 can be implemented in such a manner that a lock acquisition flag is provided for each of the shared resources, wherein the flag is switched on when the associated shared resource is locked while the flag is switched off when it is unlocked or alternatively a lock acquisition task identifier column is provided for each of the shared resources. The identifier of the task acquiring the lock to a shared resource is registered in the associated column when the shared resource is locked, while the task identifier is invalidated when the shared resource is unlocked. In the case of the instant embodiment, it is assumed that the first mentioned method is adopted. Further referring to FIG. 1, reference numeral 108 denotes a lock waiting task list which is adapted to hold for each of the shared resources a list of identifiers of those tasks which are awaiting the unlocking of the shared resource (i.e. release of the resource from the locked state), if it is locked, and finally a numeral 109 denotes an execution-ready task list containing the tasks which are in the state ready for execution by the processor 101.

Figure 2:
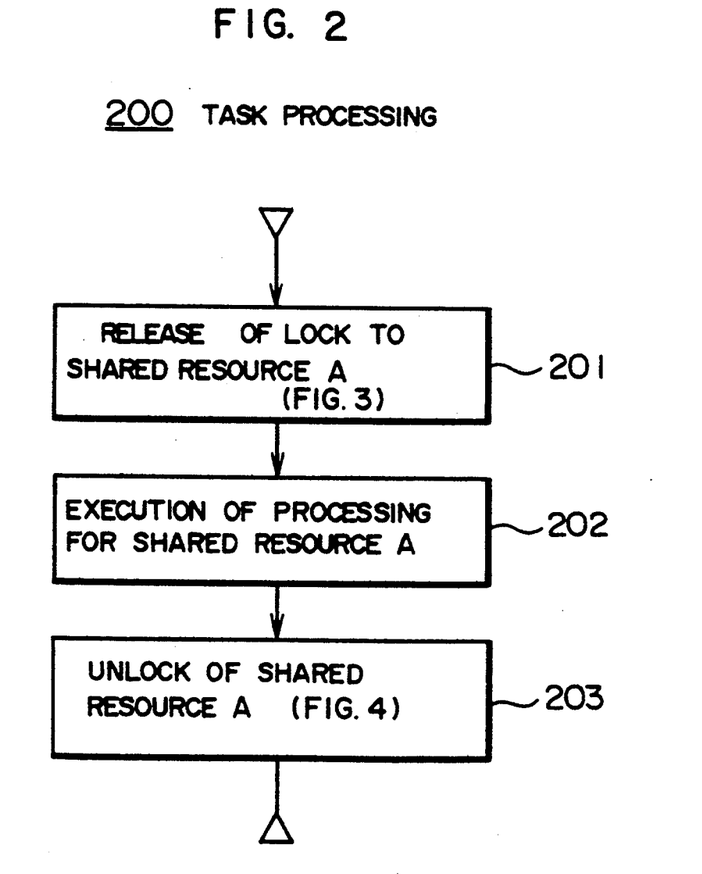
FIG. 2 is a flow diagram for illustrating the task processing procedure in general.

Next, the operations of the individual tasks will be explained by referring to FIG. 2.

When there arises a necessity for the exclusive use of a shared resource (which is assumed to be the resource A and designated by 106A in the instant embodiment) by one of the tasks 105 in the course of the processing thereof, the shared resource A is locked to the one task 105 at a step 201, being followed by the processing of that task by making use of the shared resource A at a step 202. Upon completion of the processing, the shared resource A is released from the locked state at a step 203 (unlocking of the resource A).

Figure 3:
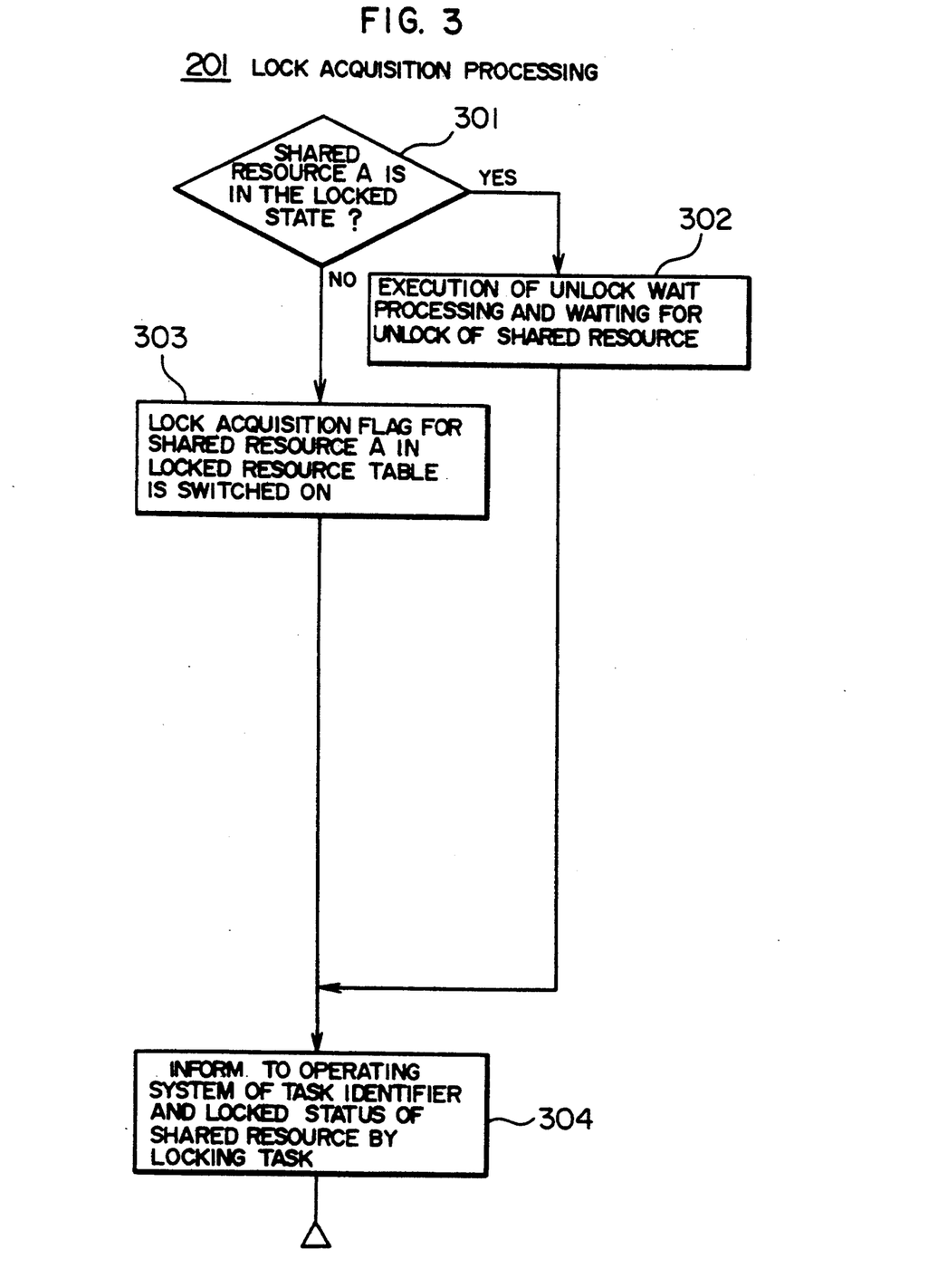
FIG. 3 is a flow chart for illustrating the outline of a processing performed by a task for acquiring the lock to a shared resource.

The lock acquisition procedure will be described below in detail by reference to FIG. 3.

At first, a task concerned refers to the entries in the locked resource table 107 to determine whether the shared resource A is in the locked state or not at a step 301. When the shared resource A is not locked, the lock acquisition flag indicating the lock to the shared resource A is switched on at the corresponding entry in the locked resource table 107 at a step 303. Subsequently, the identifier of that task itself and the lock to the shared resource A are messaged or informed to the operating system 103 at a step 304, whereupon the lock acquisition procedure terminates. On the other hand, when it is found at the step 301 that the shared resource A is in the locked state, the unlock wait processing is executed to register the task identifier concerned in the unlock waiting list 108, whereon the task takes the waiting status at a step 302. In this step 302, the task remains in the wait status until the lock of that task to the shared resource A is realized or acquired. Upon acquisition of the lock, steps 304 et seq. are executed.

Figure 5:
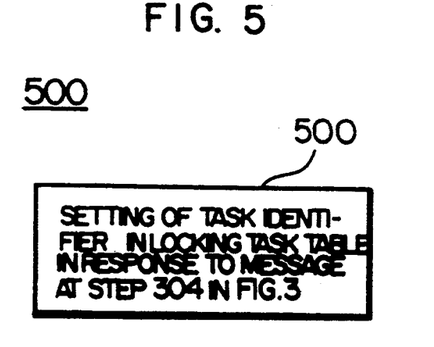
FIG. 5 is a flow chart for illustrating the processing performed by an operating system in a uniprocessor.

Upon reception of the message at the steps 304, the operating system 103 registers the task identifier as informed in the locking task table 104 at a step 500, as shown in FIG. 5. This step 500 is one of the steps which characterize the present invention.

Figure 4:
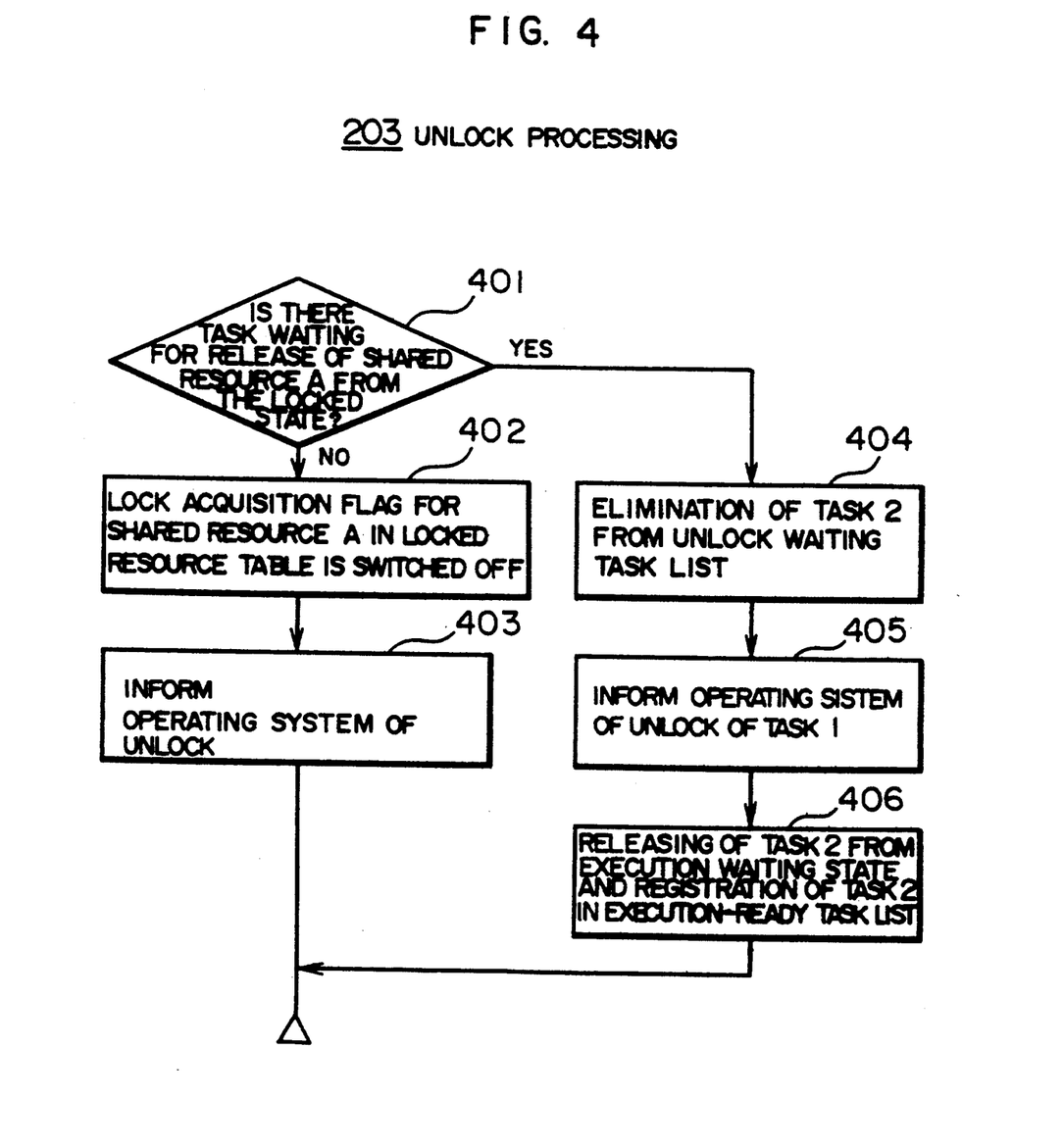
FIG. 4 is a flow chart for illustrating the outline of a processing performed by the task for releasing the shared resource from being locked.

In the following, the lock acquisition procedure and lock release procedure 203 shown in FIG. 2 will be explained in more detail by referring to FIG. 4. In the unlock procedure, decision is first made at a step 401 by referring to the unlock waiting task list 108 as to whether or not there exists the task waiting for the release of the shared resource from the locked state. If no such tasks exists, the lock acquisition flag for the shared resource A in the locked resource table 107 shown in FIG. 1 is switched off at a step 402, whereon the message informing the unlocking of the shared resource A is issued to the operating system 103 (step 403). Then, the unlock procedure comes to an end.

Figure 6:
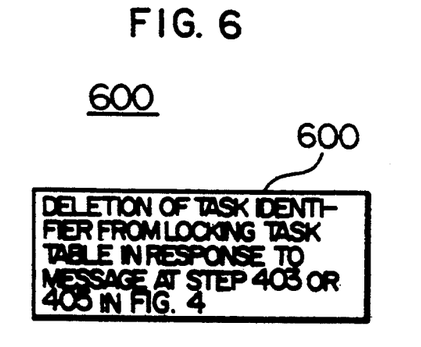
FIG. 6 is a diagram for illustrating the processing performed by the operating system in response to an unlock (lock release) message.

Upon reception of the message at the step 403, the operating system deletes the identifier of the task informed from the locking task table 104 at a step 600, as shown in FIG. 6. This step also constitutes one of the steps characterizing the present invention.

Now, turning back to FIG. 4, when the decision is made at the step 401 to such effect that there exists a task waiting for the unlock of the shared resource A, the task releasing the shared resource A from the locked state sends the message informing the unlock of the shared resource A to the operating system 104 and deletes the task identifier of the task which is the next to acquire the lock to the shared resource A from the unlock waiting task list 108 and registers that identifier in the execution-ready task list 109 while releasing that task from the execution waiting state. More specifically, the identifier of the task which is to use the shared resource A next (this task is referred to as the task 2 with the task using currently the shared resource A being referred to as the task 1 for convenience of description) is deleted from the unlock waiting task list (step 404), and the unlocking of the task 1 from the shared resource A is messaged to the operating system (step 405), whereon the task 2 is released from the execution waiting state (step 406) . Upon reception of the message at the step 405, the operating system 103 erases the identifier of the task 1 from the locking task table 104 at a step 600 shown in FIG. 6.

Ordinarily, upon task activation, the operating system 103 selects one of the tasks registered in the execution-ready task list 109. When an interrupt takes place in the course of execution of the selected task (step 202 in FIG. 2), the operating system 103 discontinues the processing of the task being currently executed and activates an interrupt processing task. At the time point when the interrupt processing task has been completed, the operating system 103 must activate a new task. The processing 700 for selecting the task to be activated at that time point is performed in such a manner as illustrated in FIG. 7 according to a teaching of the present invention.

Figure 7:
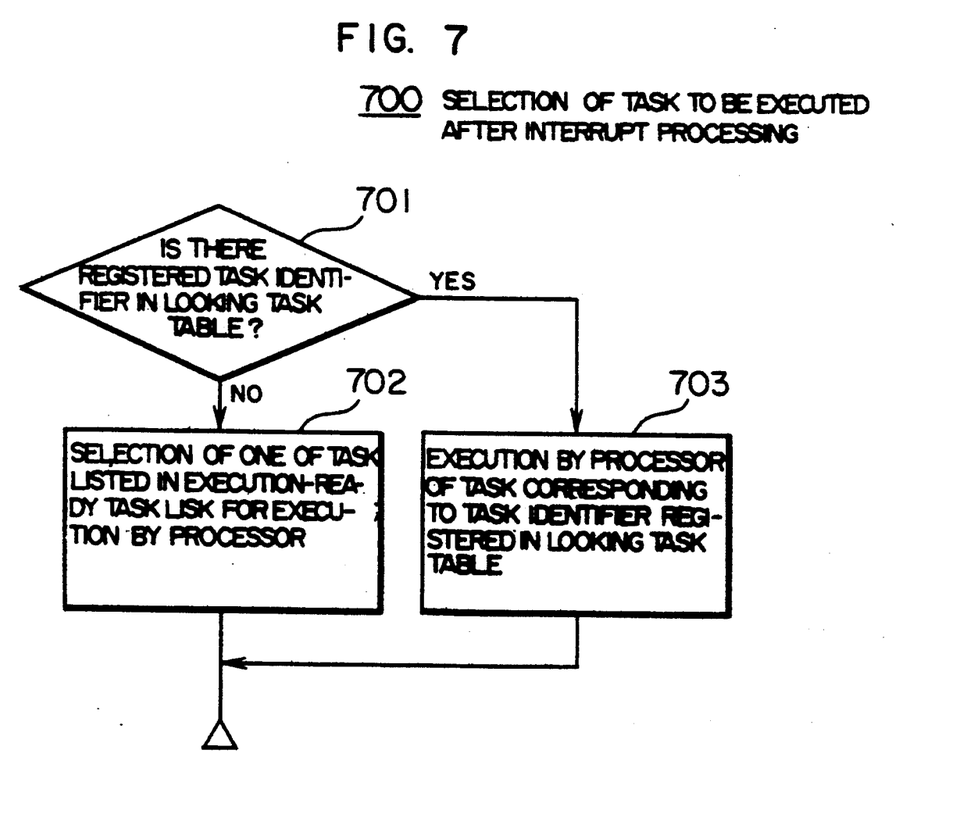
FIG. 7 is a flow chart for illustrating a task rescheduling procedure according to the invention performed after an interrupt processing.

For determining the sequence or order in which the tasks are executed, the operating system 103 makes a decision as to whether or not the identifier of a task of concern is registered in the locking task table 104 (step 701 in FIG. 7). Unless the task identifier is registered, the operating system 103 selects one of the tasks found in the execution-ready task list 109 to allow the processor 101 to execute the selected task (step 702), as with the case of the conventional system. If otherwise, the task corresponding to the task identifier mentioned above is executed by the processor (step 703) . In this way, the task executed by using the locked resource before occurrence of the interrupt can again be executed with priority at the end of the interrupt processing.

EMBODIMENT 2

Figure 8:
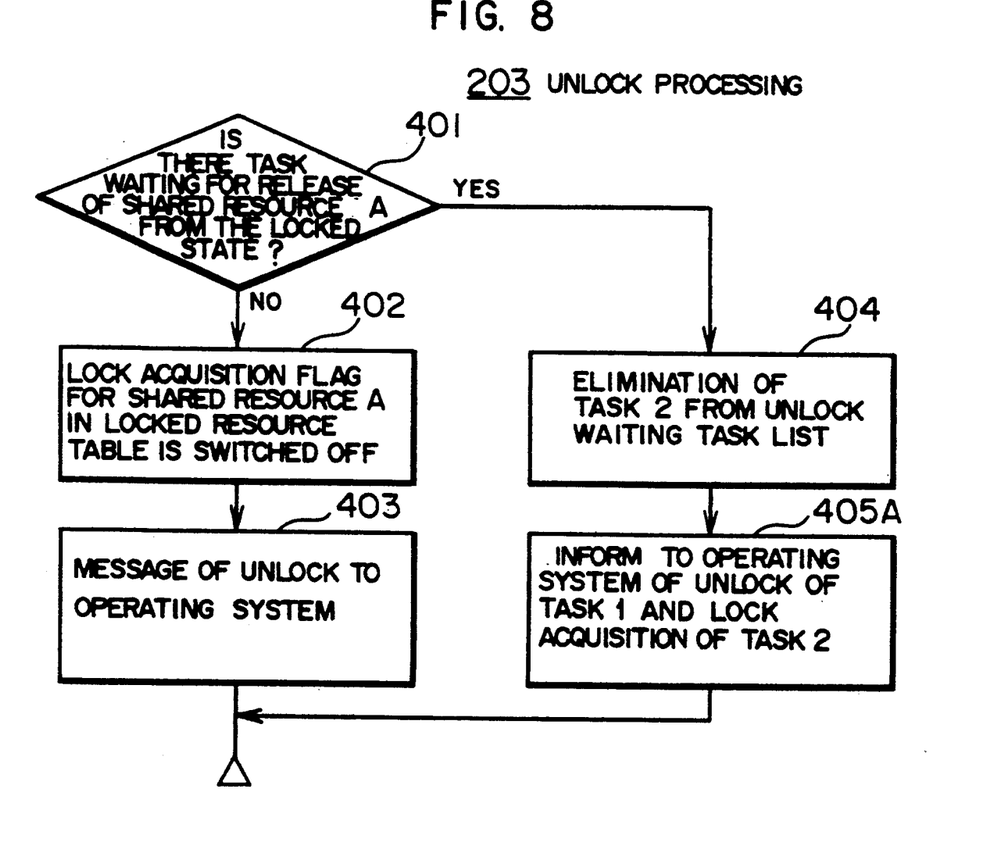
FIG. 8 is a flow chart for illustrating the unlock (lock release) processing according to another embodiment of the invention.

The instant embodiment differs from the first embodiment in that when a task unlocks or releases a resource, such task gives the right of exclusive use of the resource to another task which is waiting for the release or unlock of that resource. More specifically, the instant embodiment differs from the first embodiment in that the unlock processing 203A shown in FIG. 8 is executed in place of the unlock processing 203 shown in FIG. 4 and that the operating system 103 executes the processing 1000A shown in FIG. 9 in place of the processing 500 shown in FIG. 5. In other words, the processing 203A shown in FIG. 8 differs from the processing 203 shown in FIG. 4 in respects that the processing step 405A is executed in place of the processing steps 405 and 406 shown in FIG. 4. Now referring to step 404 of FIG. 8, a task releasing the lock to the shared resource A removes the identifier of a task which is next to use the shared resource A from the unlock waiting task list 108 (for convenience of description, the first mentioned task is called the task 1 with the task next to use the shared resource A being termed as the task 2). Next, at the step 405A, not only the unlock of the task 1 from the shared resource A but also the subsequent lock of the task 2 to the shared resource are concurrently informed to the operating system 103. In this respect, the instant embodiment differs from the first embodiment 1. It should further be noted that the task 2 is not registered in the execution-ready task list 109.

Figure 9:
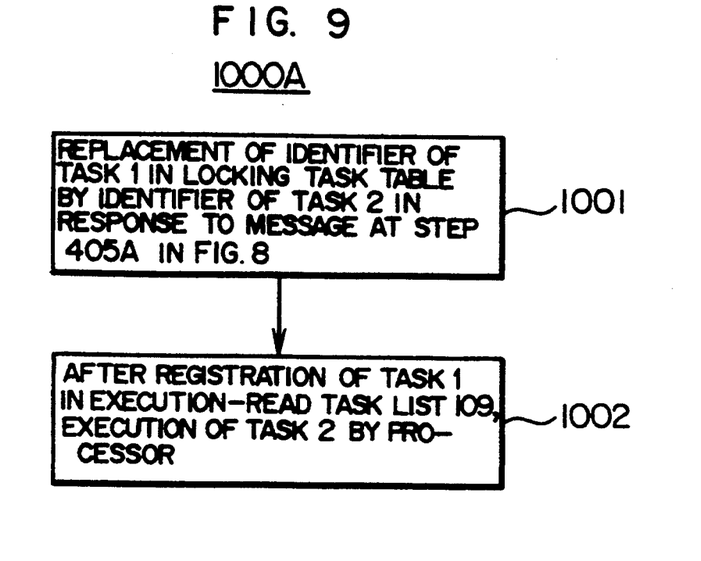
FIG. 9 is a flow chart for illustrating the processing performed by the operating system in response to a message of change of lock acquiring task as generated by the processing shown in FIG. 8.

Upon reception of the message mentioned above, the operating system 103 executes the processing 1000A shown in FIG. 9. More specifically, the task identifier being placed in the locking task table 104 is replaced by the identifier of the task 2 as messaged (step 1001). Next, after the task 1 which had been executed by a processor has been registered in the execution ready task list 109, the task identifier of the task 2 is invalidated from the unlock waiting task list 108, whereon the operating system allows the processor to execute the task 2 (step 1002). In this manner, where there exists a task awaiting the release of the shared resource from the locked state (i.e. the unlock of the resource), the next task acquired the lock to the shared resource can be executed with priority over the task which unlocked the shared resource, whereby the time period for the exclusive use of the shared resource is prevented from being unduly extended due to the wait for execution as brought about by the exclusive occupation of the shared resource.

EMBODIMENT 3

The instant embodiment is directed to a multiprocessor system including additionally another processor 101 as indicated by a phantom line block in FIG. 1 and shares similarity with the second embodiment 2 in that the task unlocking the shared resource allows another task waiting for the release of the resource to be locked thereto. Operation of the individual tasks 105 are the same as those of the tasks described above in conjunction with the second embodiment. More specifically, the lock acquisition and the lock release (or unlocking) are performed in the same manner as described hereinbefore by reference to FIGS. 3 and 8. According to the instant embodiment, the operating system is so arranged as to perform a processing 500A shown in FIG. 10 in place of the processing 500 shown in FIG. 5, a processing 600B shown in FIG. 11 in place of the processing 600 shown in FIG. 6, a processing 700B shown in FIG. 13 in place of the processing 700 and a processing 1000B shown in FIG. 12 in place of the processing 1000A shown in FIG. 9. In these respects, the instant embodiment differs from the second embodiment. More specifically, referring to FIG. 10, upon reception of the message issued at the step 304 of the lock acquisition processing 201 (FIG. 3), the operating system determines the identifier of the task which sent that the message and the identifier of the processor executing that task (step 1201) to thereby register the task identifier at the entry of the locking task table 104 corresponding to the identifier of the processor as determined (step 1202).

Figure 10:
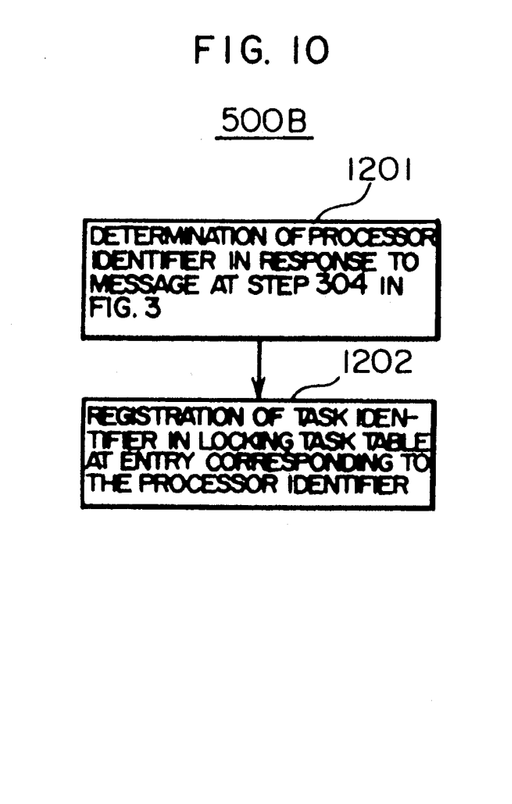
FIG. 10 is a flow chart for illustrating the processing performed by the operating system in a multiprocessor in response to a lock acquisition message.

In conjunction with the abovementioned registration, there is available a method of registering the processor identifier and the take identifier in a pair in the locking task table 104 or alternatively a method of preparing previously the entries of the locking task table 104 so that the task identifiers can be registered for each of the processors. In the case of the instant embodiment, the second mentioned method is adopted.

Figure 11:
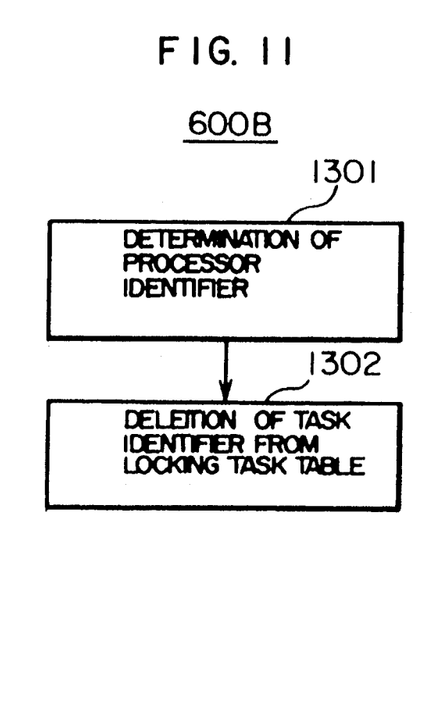
FIG. 11 is a flow chart for illustrating the unlock processing performed by the operating system in the multiprocessor in response to the lock acquisition message.

Referring to FIG. 11, upon reception of the message from the steps 403 and 405 in the unlock processing (FIG. 4), the operating system 103 determines the identifier of the processor executing the task which issued that message (step 1301) and deletes the corresponding task identifier from the locking task table 104 (step 1302).

Figure 12:
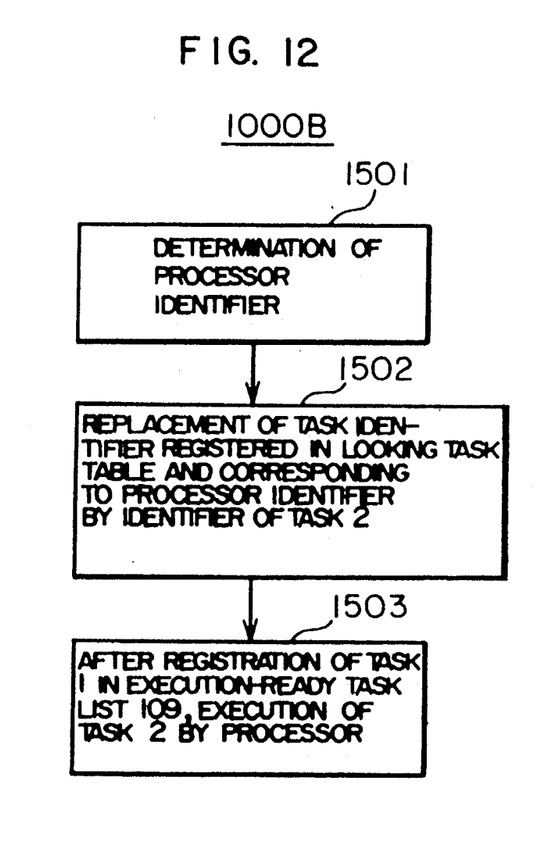
FIG. 12 is a flow chart for illustrating the processing performed by the operating system in the multiprocessor in response to the message of change of the lock acquiring task.

Referring to FIG. 12, upon reception of the message from the step 405A in the unlock processing (FIG. 8), the operating system determines the identifier of the processor executing the task which issued the message (step 1501), whereupon the operating system 103 replaces the task identifier registered at the corresponding entry in the locking task table 104 by the identifier of the task 2 informed by the message (step 1502). Subsequently, after having registered the task 1 in the execution-ready task list 109, the task 2 is executed by the associated processor (step 1503).

Figure 13:
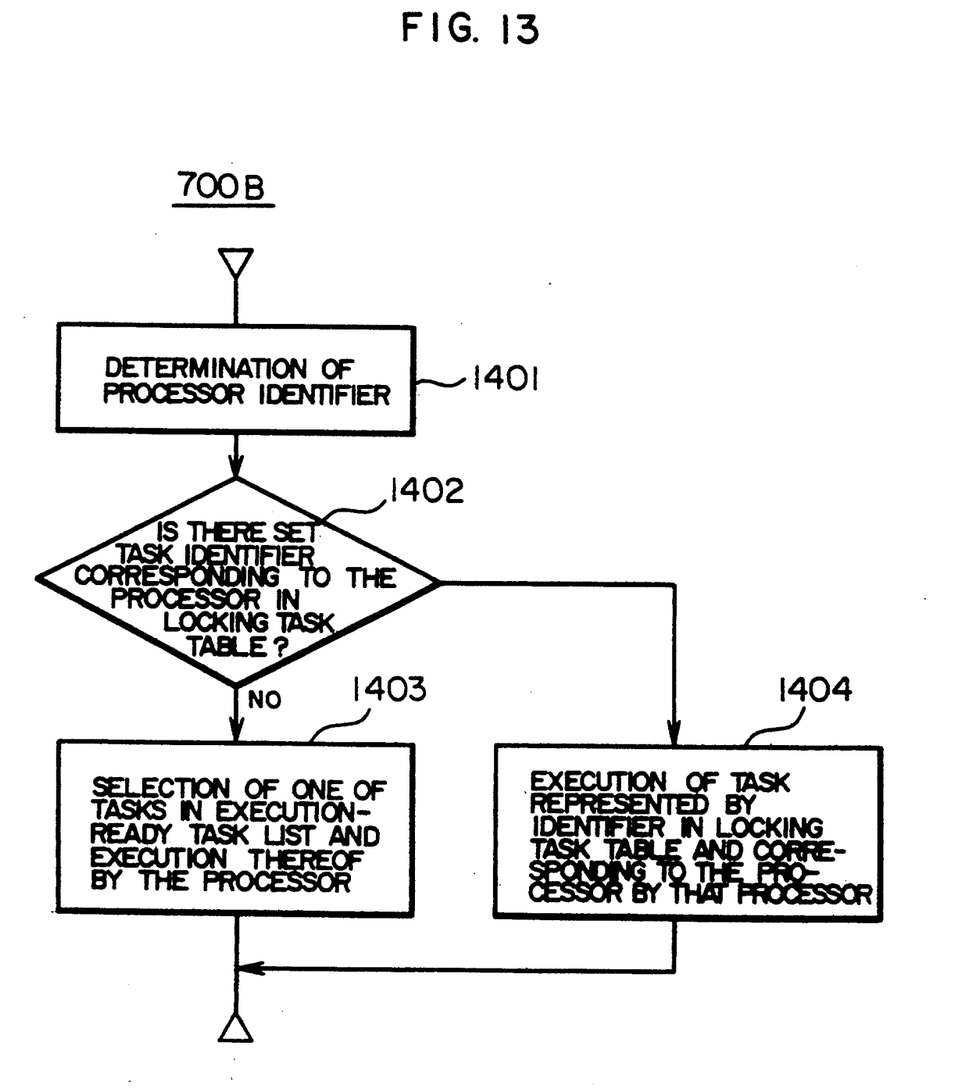
FIG. 13 is a flow chart for illustrating a task scheduling processing performed in the multiprocessor according to a teaching of the invention.

In the task reschedule processing executed by the operating system 103 in response to the occurrence of interrupt to the processor executing the processing of a task (step 202 in FIG. 2) for determining the subsequent task execution sequence, the identifier of the processor to which the interrupt has occurred is determined (step 1401), being followed by the decision as to whether or not the task identifier is registered in the locking task table 104 at the entry corresponding to the identifier of the processor as determined (step 1402). Unless the identifier concerned is registered, one of the tasks is selected from the execution-ready task list to allow the processor concerned to execute the selected task, as in the case of the conventional system (step 1403). Otherwise, the processor is caused to execute the task in the locking task table corresponding to that processor (step 1404). In this way, in the multiprocessor system according to the instant embodiment, the interrupted task which is locking the resource can be executed with priority after the processing of the interrupt by the associated processor.

EMBODIMENT 4

Figure 14:
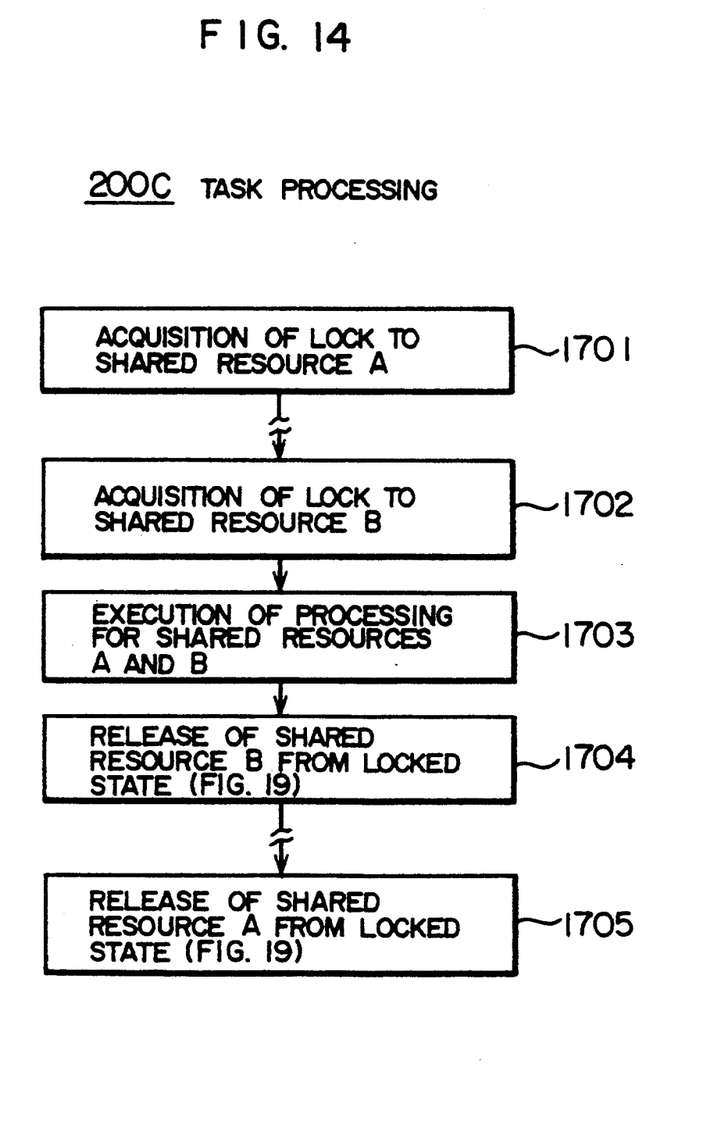
FIG. 14 is a flow chart illustrating the outline of a processing performed by a task using shared resources in overlap.
Figure 15:
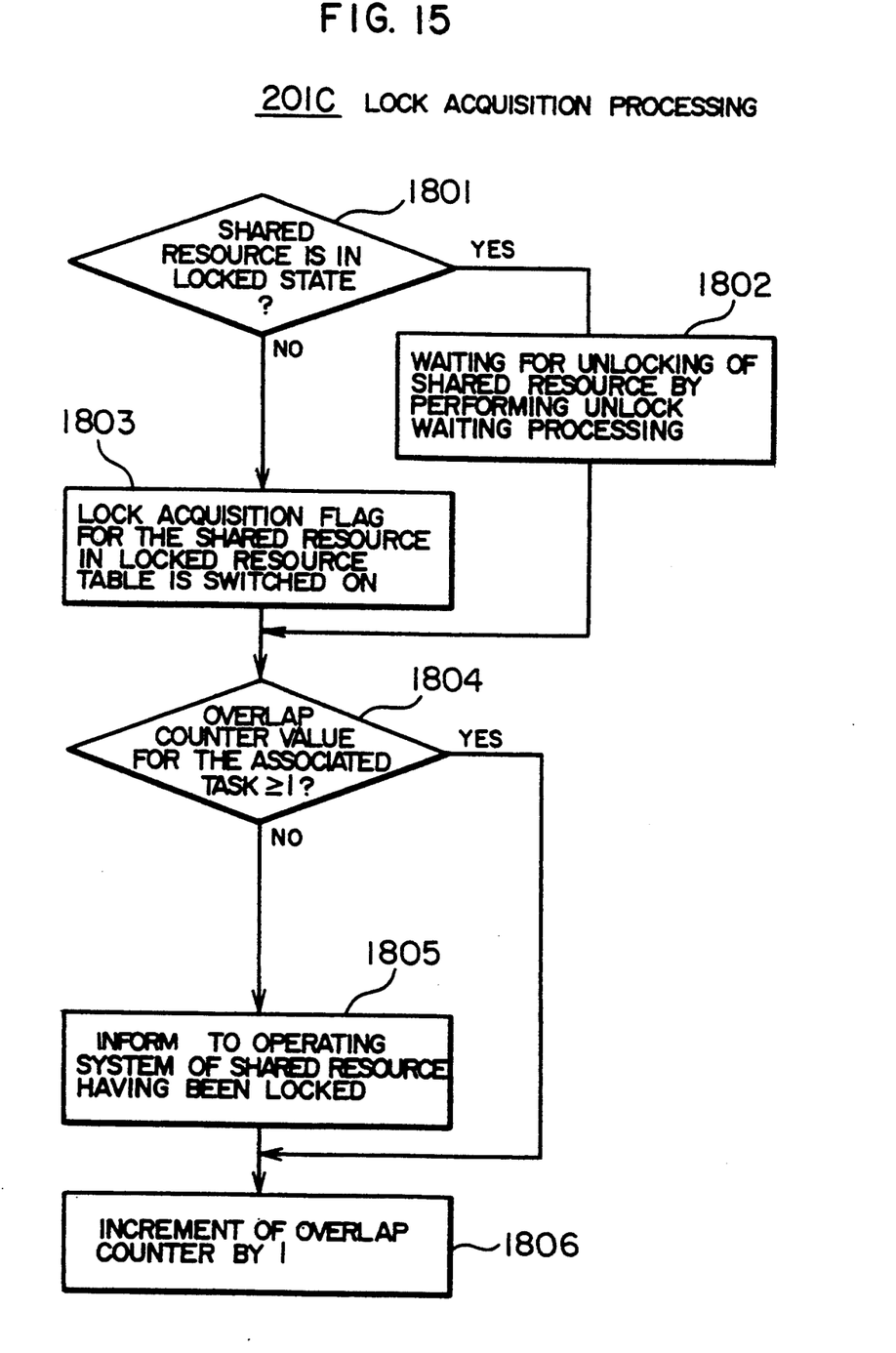
FIG. 15 is flow chart for illustrating the outline of a processing for acquiring the lock to shared resources used in overlap.

The instant embodiment is directed to the uniprocessor system in which a single processor is employed and differs from the first embodiment in that the individual tasks can utilize the shared resources in overlap. To this end, there are provided overlap counters 1606 in correspondence to the individual tasks, as indicated by single-dotted blocks in FIG. 1. The operating system 103 executes the processings described hereinbefore with reference to FIGS. 5 to 7, as in the case of the first embodiment. On the other hand, the processings of the individual tasks are modified as mentioned below. Namely, in place of the task processing 200 shown in FIG. 2, a processing 200C shown in FIG. 14 is executed. In place of the lock acquisition processing 201 shown in FIG. 3, a processing 201C shown in FIG. 15 is executed. Further, the unlock processing 203 shown in FIG. 4 is replaced by a processing 203C shown in FIG. 16. Referring to FIG. 14, in case the execution of a task 105 requires such overlap lock processing that a difference shared resource (designated by B for convenience of description) is to be exclusively used in the course of the processing of that task performed by using exclusively the shared resource (designated by A), the lock to the shared resource A is first acquired (step 1701) and subsequently the lock to the shared resource B is acquired (step 1702) in the course of the processing performed by using the locked shared resource A. After execution of the processing by using the shared resources A and B (step 1703), the shared resource B is first released from the locked state (step 1704). Thereafter, the shared resource A is released from the locked state (step 1705).

Now, the lock acquisition processing executed at the step 1701 or 1702 shown in FIG. 14 will be described in detail by referring to FIG. 15. Decision is first made as to whether or not the shared resource to be used is in the locked state by referring to the lock acquisition flag for that shared resource registered in the locked resource table 107 (step 1801). If the shared resource concerned is in the locked state, a processing for awaiting the release of that resource from the locked state is performed by registering the identifier of the task requiring the use of the resource in the unlock waiting task list 108. Upon releasing of the resource from the locked state, the task is released from the waiting state (step 1802), whereon the steps 1804 et seq. are executed. On the other hand, unless the resource concerned is in the locked state, the lock acquisition flag for the shared resource to be used as registered in the locked resource table 107 is switched on to indicate that the resource has now been locked (step 1803).

Subsequently, by referring to the overlap counter 1606 for the task of concern, it is decided whether the lock of the shared resource has been informed to the operating system 103 by that task, i.e. whether or not the value of the corresponding overlap counter is greater than 1 (one), inclusive, (step 1804). When the result of this decision step is affirmative (YES), the value of the overlap counter 1606 is incremented by one (step 1806), whereupon the processing comes to an end. When the locking of the resource is not messaged to the operating system 103, i.e. when the value of the overlap counter is 0 (zero), the lock of the shared resource is informed to the operating system 103 (step 1805), whereon the associated overlap counter is incremented by one (step 1806).

Figure 16:
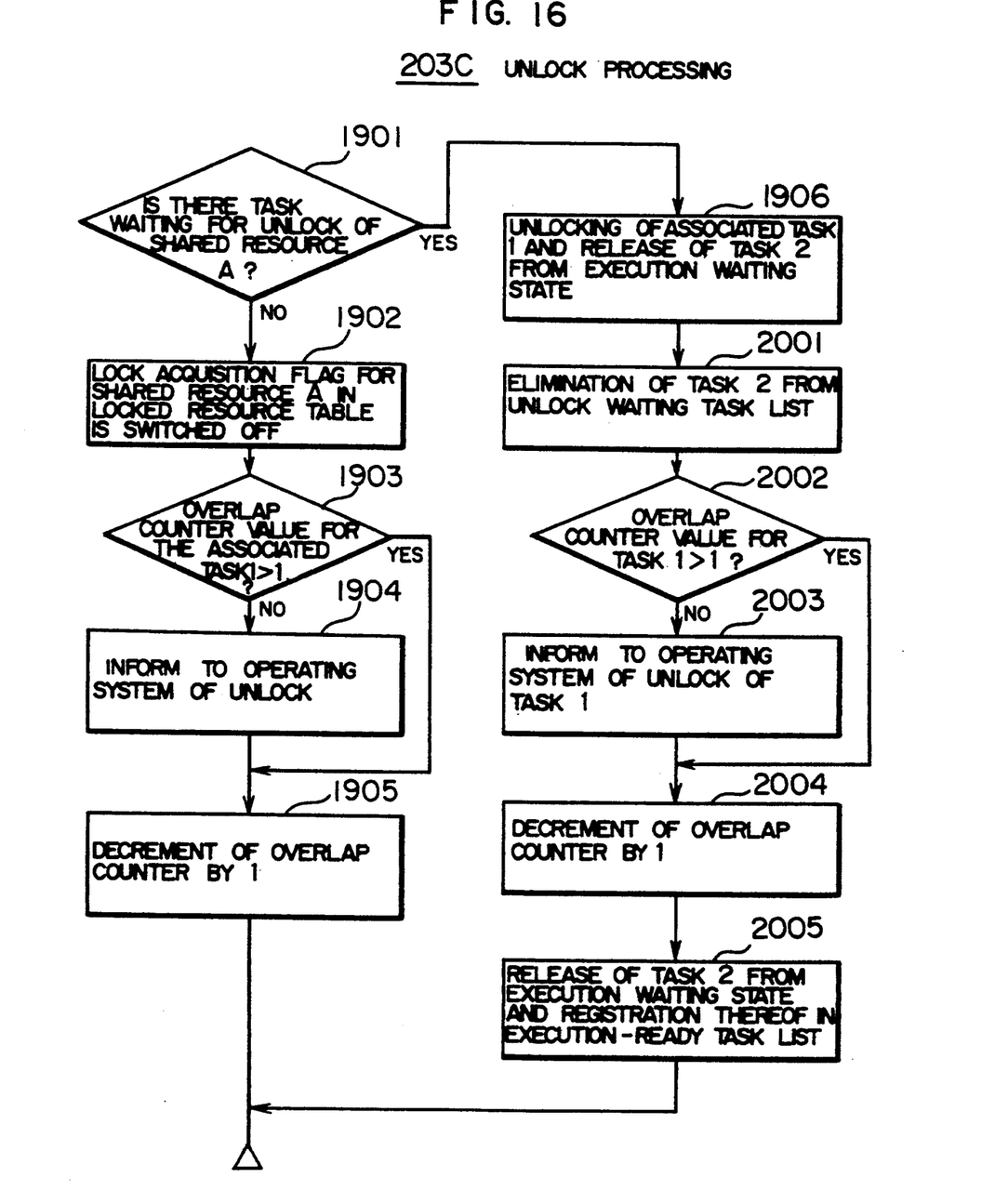
FIG. 16 is a flow chart for illustrating the outline of the processing for releasing the shared resources used in the overlap.

Next, the unlock processing 203C performed at the step 1704 or 1705 shown in FIG. 14 will be described in detail by referring to FIG. 16. In this unlock processing, it is first decided whether there exists a task waiting for the release of a shared resource of concern from the locked state (step 1901). If the waiting task exists, the task releasing the resource informs the operating system 103 of the unlock of the resource and then eliminates the task identifier of the task next to acquire the lock to the unlocked resource from the unlock waiting task list 108 and registers the identifier in the execution-ready task list 109 while releasing that task from the execution waiting state (step 1906).

On the other hand, when the task awaiting the unlock of the shared resource is absent, the lock acquisition flag for the shared resource in the locked resource table is switched off (step 1902). It is then decided whether the value of the overlap counter 1606 associated with the task concerned is greater than 1 (one) (step 1903). If so, the steps 1905 et seq. are executed. When the overlap counter value is equal to "1", the task informs the operating system of the fact that it has unlocked the shared resource (step 1904), being followed by a step 1905 where the value of the overlap counter 1606 associated with the abovementioned task is decremented by "1". At a next step 1906, the task waiting for the unlock of the shared resource (this task is referred to as the task 2 for discriminating it from the task acquiring currently the lock to the resource and referred to as the task 1) is deleted from the unlock waiting task list 108 (step 2001), and decision is made as to whether or not the value of the overlap counter 1606 associated with the task 1 is greater than "1" (step 2002). If so, steps 1909 et seq. are executed. When the overlap counter value is equal to "1", the operating system is informed of the fact that the task 1 has unlocked the shared resource concerned (step 2003).

Next, the overlap counter value for the task 1 is decremented by "1" (step 2004), being followed by a step 2005 where the task 2 is released from the waiting state. In this manner, when the shared resources are to be used in overlap, the wasteful processing for informing the operating system of the lock acquisition every time the resource is locked can be spared. Further, since the unlock is not informed to the operating system even when a shared resource is released from the locked state so long as another shared resource is in the locked state, the locking task which was being executed before occurrence of the interrupt can be re-executed with priority after the interrupt has been disposed of, as described hereinbefore in conjunction with FIG. 7.

EMBODIMENT 5

Figure 17:
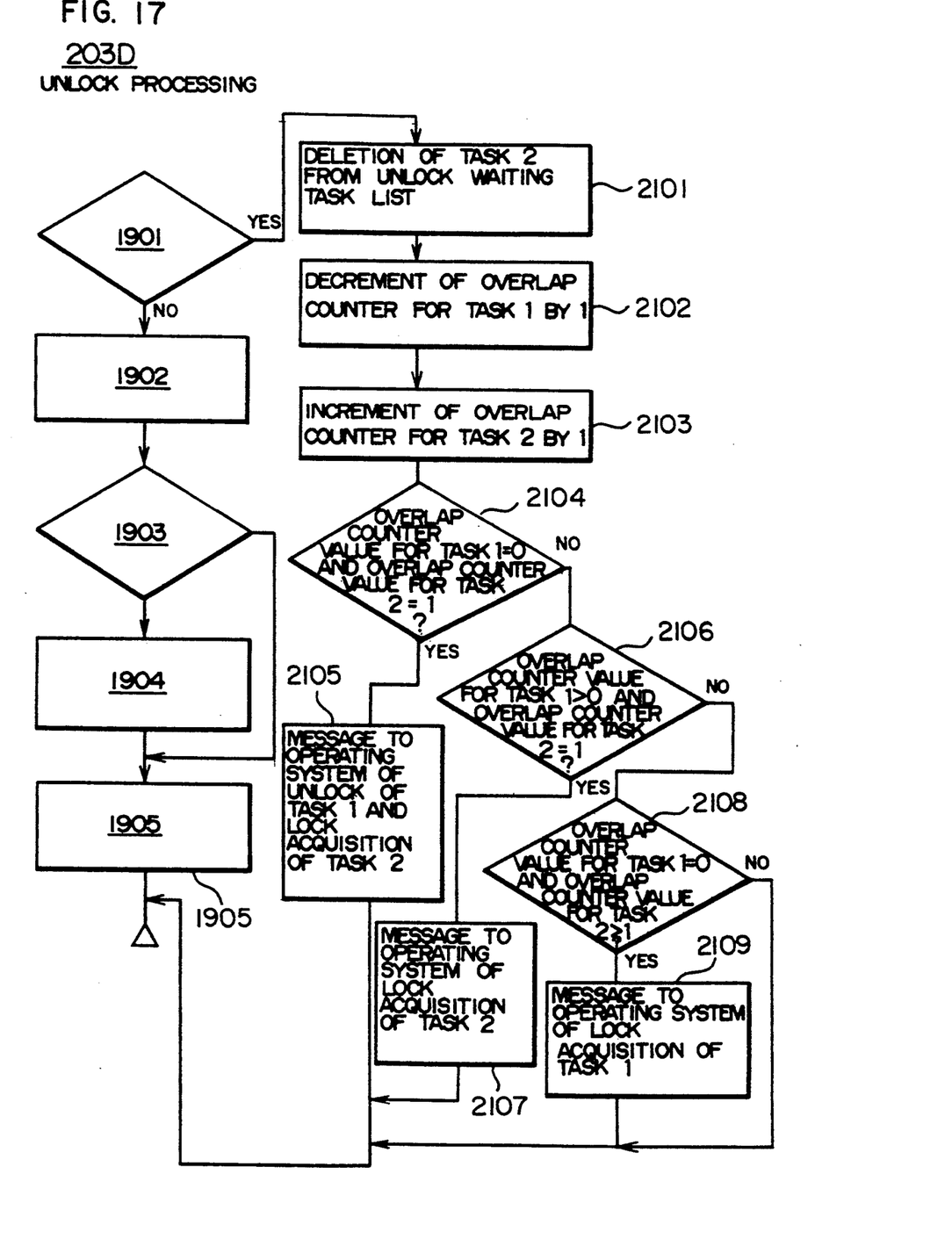
FIG. 17 is a flow chart illustrating the processing for the shared resources used in overlap according to another embodiment of the invention.

The instant embodiment is similar to the fourth embodiment 4 in that shared resources are used in overlap by a task but differs from the latter in that the task releasing a shared resource allows another task awaiting the unlock of that resource to lock itself thereto in succession, as in the case of the second embodiment. Also according to this embodiment, the overlap counter 1606 is provided in association with each of the tasks which is processed in the same manner as the processing 200C shown in FIG. 14. However, the unlock procedure 203D shown in FIG. 17 differs from the procedure shown in FIG. 16 in that the processing 1906 is replaced by a processing 1906D. The processing steps 1901 to 1905 shown in FIG. 17 are same as those designated by same reference numerals in FIG. 16. Accordingly, the following description is directed only to the procedure 1906D. At a step 2101, the identifier of the waiting task which is next to use the shared resource (this waiting task is referred to as the task 2 with the task acquiring currently the lock to the resource being referred to as the task 1 for convenience of distinction) is deleted from the unlock waiting task list 108. At a step 2102, the value of the overlap counter 1606 associated with the task 1 is decremented by "1". Thereafter, the value of the overlap counter 1606 associated with the task 2 is incremented by "1" at a step 2103.

Next, at a step 2104, decision is made as to whether the value of the overlap counter 1606 associated with the task 1 is "0" and whether that of the counter 1606 associated with the task 2 is "1". When these conditions are satisfied, then the operating system 103 is informed of the unlock of the shared resource by the task 1 and the successive use thereof by the task 2 (step 2105). Otherwise, it is then decided whether the value of the overlap counter 1606A associated with the task 1 is greater than "0" and whether that of the overlap counter 1606B associated with the task 2 is equal to "1" (step 2106). When the result of the decision is affirmative, the operating system 103 is informed of the lock acquisition by the task 2 (step 2107). Otherwise, it is then decided whether the value of the overlap counter 1606A associated with the task 1 is "0" and whether that of the overlap counter 1606B is greater than "1" (step 2108). If so, the operating system 103 is informed of the unlock of the resource by the task 1 (step 2109). Otherwise, the procedure comes to an end.

Operation performed by the operating system 103 in response to the reception of the information or message mentioned above is same as described hereinbefore in conjunction with the second embodiment. Further, other operation of the operating system 103 is same as that of the embodiments 1 and 2 described hereinbefore in conjunction with FIG. 5 to 7.

As will be appreciated, even in the case where the resources are used in overlap, the next task acquired the lock to the shared resource is executed with priority so long as all the shared resources have been released from the locked state, whereby advantageous effects similar to those of the second embodiment can be obtained.

EMBODIMENT 6

This embodiment differs from the fourth embodiment in that a multiprocessor system is adopted. In this case, operation of the operating system is same as that described hereinbefore in conjunction with FIGS. 10 to 13, while operations of the individual tasks are same as those described by reference to FIGS. 14, 15 and 17. It should be mentioned that when a shared resource is released from the lock state by a task, that resource can be locked in succession to another task waiting for the unlock thereof. The task operation at that time is same as described hereinbefore by reference to FIGS. 14, 15 and 16. Operation of the operating system illustrated in FIGS. 11, 12 and 13 may be modified so as to correspond to the operation illustrated in FIG. 9. Thus, in the case of the instant embodiment, similar effects to those of the fourth and fifth embodiments can be obtained. Further, the task registered in the execution-ready task list at the step 2005 shown in FIG. 16 can be executed by other processor in parallel. In that case, throughput is correspondingly enhanced to another advantage.

As will now be appreciated from the foregoing description, the invention teaches that in a system in which an operating system adapted for task scheduling and another application system for exclusive control/management of the shared resource are mutually interlocked, means is provided for allowing the application system to inform the operating system of the shared resource being held in the locked state so that upon occurrence of the task re-scheduling due to interrupt in the locked state, such task scheduling is made possible that the task locking the shared resource is executed with priority. By virtue of this arrangement, the conflict in the lock acquisition with other tasks, which may otherwise take place when re-execution of the locking task is put off, can be positively prevented, which in turn means that the number of steps involved in the unlock waiting processing to be performed for the task failed in the lock acquisition can be significantly reduced.

What is claimed is:

1. A computer implemented task scheduling method for use in a computer system including a plurality of shared resources to be used exclusively by a plurality of tasks each of which has a predetermined execution priority, said task scheduling method comprising the steps of:
    registering a task identifier representing the task which is being executed, upon locking by said task onto one of said shared resources, into a locking task table;
    deleting the registered task identifier in said locking task table when said task being executed unlocks said one of said shared resources;
    suspending, upon occurrence of an interrupt, execution of said task being executed to allow an interruption processing task to be executed;
    after execution of said interruption processing, deciding whether said task identifier, representing said task which was being executed while locking said one of said shared resources, is registered in said locking task table, when a task to be executed next is to be selected; and
    selecting, when said deciding step decides that said task identifier is registered in said locking task table, said task designated as registered by said task identifier as said task to be executed with priority and selecting, when said deciding step decides that said task identifier is not registered in said locking task table, one of said tasks based on their predetermined priorities as the task to be executed with priority.

2. A task scheduling method according to claim 1, further including a step of selecting one of said plurality of tasks waiting for execution in an executable task list based upon priorities assigned to said tasks, respectively, in case no valid task identifier is detected as registered in said locking task table.

3. A task scheduling method according to claim 1, wherein said registering step further includes the steps of:
    informing an operating system of said task identifier when said task being executed has locked onto a shared resource; and
    registering by said operating system said task identifier of said task being executed to said locking task table in response to said informing step.

4. A task scheduling method according to claim 1 wherein said computer system includes a plurality of processors;
    wherein in the step of registering said task representing of said task being executed, the registered task identifier further identifies a processor executing said task;
    said deciding step further includes the step of judging whether said task identifier is registered in said locking task table, when a task to be executed next by the identified processor is selected upon completion of the execution of said interrupt processing task by said identified processor; and
    said selecting step further includes the step of selecting said task represented by said task identifier as the task to be executed next by said identified processor if said task identifier indicates said task is registered.

5. A task scheduling method according to claim 1, wherein said registering step further includes the steps of:
    determining upon said task being executed locking onto one of a plurality of shared resources as required by said task, whether said task has locked onto another of said shared resources; and
    registering said task identifier of said task when said task has not locked onto another of said shared resources;
    said deciding step further including the steps of:
        determining upon the unlocking of one of said shared resources required by said task being executed, whether said task locks onto another of said shared resources,
        detecting said registered task identifier of said task if said task does not lock onto another of said shared resources, and
        informing an operating system of said invalidating of said task identifier.

6. A task scheduling method according to claim 1, further comprising the steps of:
    informing said operating system of the unlocking by a first task of said shared resource and of the locking by a second task thereby locking onto said shared resource;
    replacing in response to said informing step, by said operating system a task identifier of said first task with the task identifier of said second task; and
    scheduling so that said first task is placed in an execution-ready state with said second task being placed in a running state.

7. A computer implemented task scheduling method for use in a computer system including a plurality of shared resources accessible by a plurality of tasks, wherein priority is granted to one of said plurality of tasks which has successfully locked onto a shared resource, said task scheduling method comprising the steps of:
    determining whether one of said tasks has successfully locked onto said shared resource;

informing an operating system of said one of said task, locking onto said shared resource;

registering by a processor a task identifier indicating that said one of said task, has locked onto said shared resource into a locking task table;

deleting, by said processor, said task identifier in said locking task table upon the unlocking of said shared resource by said one of said tasks;

deciding, when a task to be executed next is to be selected, whether a task identifier is registered in said locking task table;

selecting, when the deciding step has decided that a task identifier is registered in said locking task table, a task corresponding to said task identifier which was decided as being registered in said locking task table as the next task to be executed; and selecting, when the deciding step has decided that a task identifier is not registered in said locking task table, one of a plurality of tasks waiting in an execution wait state with the highest priority as the next task to be executed.

8. A computer implemented task scheduling method for use in a computer system including a plurality of shared resources accessible by a plurality of tasks each of which has a predetermined execution priority, and a locking task table, said task scheduling method comprising the steps of:

registering, in said locking task table, a task identifier identifying one of said plurality of tasks when said one of said plurality of tasks locks one of said shared resources and deleting said task identifier when said one of said plurality of tasks unlocks said one of said shared resources;

suspending, by a processor, execution of a task running in response to occurrence of an interrupt to execute an interrupt task processing;

in response to termination of execution of said interrupt task processing, referring by said processor, to said locking task table to determine whether a task identifier is registered in said locking task table;

in response to determination in said referring step indicating that a task identifier is registered in said locking task table, selecting by said processor, with priority a task corresponding to the registered task identifier as a task to be executed next; and in response to determination in said referring step indicating that a task identifier is not registered in said locking task table, selecting, by said processor, one of said tasks based on their predetermined priorities as the task to be executed next.

9. A task scheduling method according to claim 8, wherein said selecting step selects a task to be executed next in accordance with said predetermined priority when said referring step indicates a determination that a task identifier has not been registered in said locking task table.

* * * * *